United States Patent [19]

Yeh et al.

[11] Patent Number: 5,706,409
[45] Date of Patent: Jan. 6, 1998

[54] IMAGE SHIFTING SYSTEM FOR USE IN A DOCUMENT PROCESSING SYSTEM

[75] Inventors: Thomas I. Yeh, Penfield; Peter T. Palamar, Webster, both of N.Y.

[73] Assignee: Xerox Corporation, Stamford, Conn.

[21] Appl. No.: 673,481

[22] Filed: Jul. 1, 1996

[51] Int. Cl.$^6$ ................................................ G06K 15/00
[52] U.S. Cl. ..................................... 395/106; 395/105
[58] Field of Search ................................. 395/115, 116, 395/106, 105, 112, 114, 113, 111, 117, 787, 782, 786, 835, 783, 827, 834, 828, 830, 832, 107; 358/474, 488, 449, 453, 298

[56] References Cited

U.S. PATENT DOCUMENTS

| 4,394,693 | 7/1983 | Shirley | 358/298 |
| 5,349,647 | 9/1994 | Freiburg et al. | 395/115 |
| 5,606,648 | 2/1997 | Walthen et al. | 375/107 |

*Primary Examiner*—Arthur G. Evans

[57] ABSTRACT

There is provided an image data shifting system for a document processing system including a scanning device for reading a document including one or more hardcopy pages and converting the hardcopy pages to corresponding electronic pages with each electronic page being represented by image data. Each hardcopy page is scanned as a series of scanlines and the scanner generates a signal prior to scanning each scanline. Each scanline read by the scanner is stored in memory as image data representative of one of the electronic pages. The image shifting system includes a detector for detecting a first signal generated by the scanner and a second signal generated by the scanner. The image shifting system further includes a write control system for causing a plurality of fill pixels to be written consecutively into the memory, in response to detecting the first signal, so that upon subsequently writing image data corresponding with a portion of one of the electronic pages into the memory, in response to detecting the second signal, the presence of the consecutively written fill pixels causes the image data corresponding with the portion to be shifted relative to a position that the image data corresponding with the portion originally possessed in the one of the electronic pages.

21 Claims, 10 Drawing Sheets

IMAGE SHIFTING SYSTEM FOR USE IN A DOCUMENT PROCESSING SYSTEM

BACKGROUND OF THE INVENTION

This invention relates generally to a document processing system and, more particularly, to an image shifting system with a memory, the memory receiving the image to be shifted at a selected time and the shifting being achieved by inserting fill material into a section of the memory prior to the selected time.

Electronic printing systems typically include an input section, sometimes referred to as an input image terminal ("IIT"), a controller, sometimes referred to as an electronic subsystem ("ESS") and an output section or print engine, sometimes referred to as an image output terminal ("IOT"). In one type of electronic printing system, manufactured by Xerox® Corporation, known as the DocuCentre® electronic printing system, a job can be inputted to the printing system from, among other sources, a network or a scanner. An example of a printing system with both network and scanner inputs is found in the following patent:

U.S. Pat. No. 5,349,647

Patentees: Freiburg et al

Issued: Sep. 20, 1994

U.S. Pat. No. 5,349,647 permits a document to be scanned once and printed as many times as desired. In particular, a multiple page job may be stored in a page buffer and a selected number of job copies outputted at the IOT.

As should be appreciated, the printing system of U.S. Pat. No. 5,349,647 permits a job to be image processed at various points within the printing system. One image processing operation, known as "cut and paste", permits an image to be shifted relative to its original position within an electronic page of an electronic document. The image may be shifted through respective operations at, among other places, the page buffer or IOT. In a first approach, an electronic page stored in the page buffer includes an image portion, which image portion can be shifted from one location to another. It is believed that shifting can be achieved by discarding selected pixels and, in some cases, adding fill or masked pixels. As will be appreciated, this operation can be performed readily with memory components other than a page buffer, such as one or more registers.

In a second approach, an image copy can be read out of the page buffer in a manner that permits shifting of the image. A horizontal shift may be achieved with a conventional digital copier, by delaying or advancing the point where readout of memory data begins. More particularly, a shift may be achieved by initially delaying the reading of bits for a scanline or by starting the reading of bits early. For a vertical shift, image position is shifted by feeding copy paper earlier or later, thus changing registration—the position of the pixels, relative to one pair of edges, is not changed.

The technique of the first approach is believed to require the manipulation of an entire electronic page. Thus, a page worth of memory is required for the technique in which shifting is performed on a stored electronic page. Moreover, processing time is required when a page is stored and thereby manipulated. While the technique of the second approach is believed to be more straightforward than the technique of the first approach, it does not appear to maximize memory usage. That is, pursuant to printing, a page is decompressed and part of the page is printed by suitable manipulation of the a raster output scanner. Thus, a full page worth of memory appears to be required, at one time or another, for the respective techniques of both the first and second approaches. Both image manipulation time and memory usage are vital concerns in a mid-priced document processing system where image manipulation and memory resources are optimized to minimize trait machine cost (UMC). It would be desirable to provide a shifting technique that optimizes UMC by not only minimizing the amount of time required to shift an image, but maximizing memory usage.

SUMMARY OF THE INVENTION

In accordance with one aspect of the present invention, there is provided an image shifting system for a document processing system including a source of image data for generating a data stream with at least a portion of the data stream including image data or a representation thereof. The image data of the data stream corresponds with an image disposed in an original position on an electronic page and the image data is transmitted from the image data source to a memory for storage therein. The image shifting system inserts pixels into the data stream so that the image data is stored in the memory in a manner causing a reproduction of the image of the electronic page to be shifted relative to its original position. The image shifting system includes: a detection system for detecting a time interval during which a plurality of fill pixels are to be written to a first location in the memory; and a write control system, responsive to said detection system, for causing the plurality of fill pixels to be written consecutively to the first location in the memory at a first time so that upon subsequently writing the portion of the data stream including image data to a second location in the memory at a second time, the presence of the consecutively written fill pixels cause said shifting of at least a portion of the reproduction of the image to occur.

In accordance with another aspect of the present invention, there is provided a method for shifting image data, representative of one or more electronic pages in a document processing system including a scanning device for reading a document including one or more hardcopy pages and converting the hardcopy pages to corresponding electronic pages with each electronic page being represented by image data. Each hardcopy page is scanned as a series of scanlines and the scanner generates a signal prior to scanning each scanline. Each scanline read by the scanner is stored in memory as image data representative of a portion of one of the electronic pages. The method includes a) detecting, with an image shifting subsystem, a first signal generated by the scanner; b) detecting, with the image shifting subsystem, a second signal generated by the scanner; and c) prior to detecting the second signal generated by the scanner, writing a plurality of fill pixels consecutively into the memory, in response to detecting the first signal with the image shifting subsystem, so that upon subsequently writing image dam corresponding with a portion of the one of the electronic pages into the memory, in response to detecting the second signal with the image shifting subsystem, the presence of the consecutively written fill pixels causes the image data of the portion of the one of the electronic pages to be shifted relative to a position that the image data originally possessed in the one of the electronic pages.

3

DESCRIPTION OF ONE OR MORE PREFERRED EMBODIMENTS

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
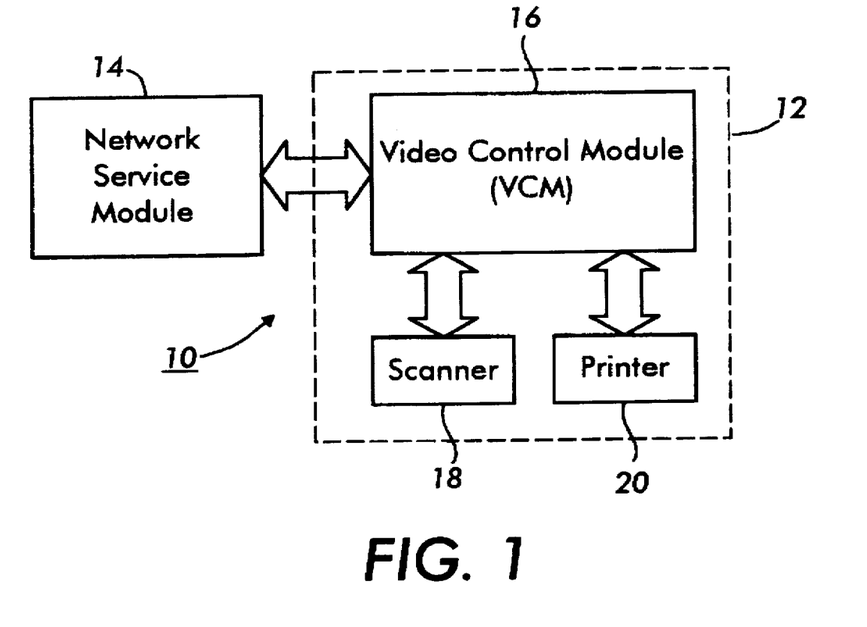
FIG. 1 is a block diagram depicting a multifunctional, network adaptive printing machine.

Referring to FIG. 1, a multifunctional, network adaptive printing system is designated by the numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which will be described in further detail below, coordinates the operation of the scanner and printer in a digital copying arrangement. In a digital copying arrangement, the scanner 18 (also referred to as image input terminal IIT)) reads an image on an original document by using a CCD full width array and converts analog video signals, as gathered, into digital signals. In turn, an image processing system 22 (FIG. 2), associated with the scanner 18, executes signal correction and the like, converts the corrected signals into multi-level signals (e.g. binary signals), compresses the multi-level signals and preferably stores the same in electronic precollation (EPC) memory 24.

Referring again to FIG. 1, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory 24 (FIG. 2) while the imaging source is turned on and off, in accordance with

4 the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 2:
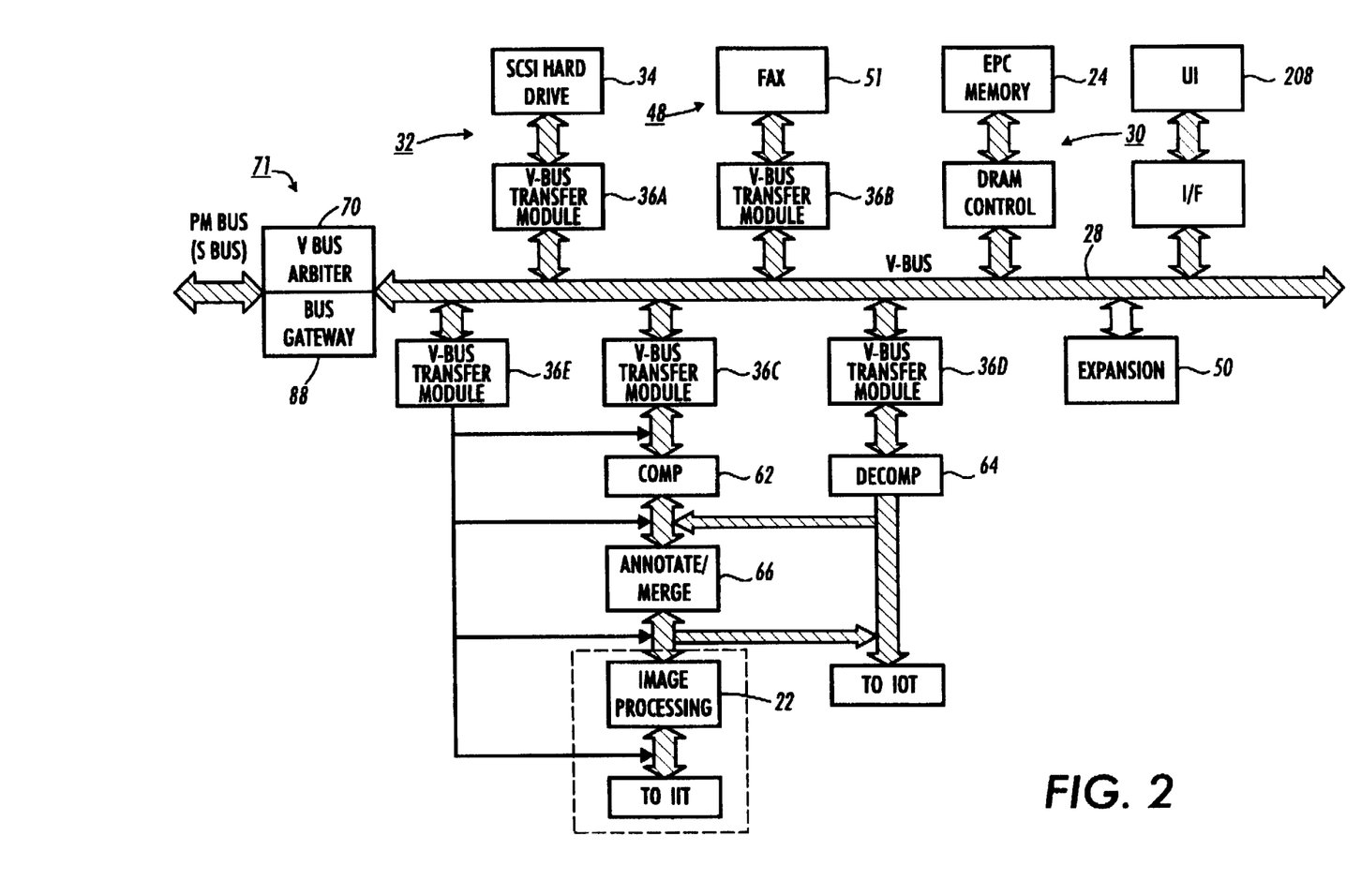
FIG. 2 is a block diagram of a video control module for the printing machine of FIG. 1.

Referring specifically to FIG. 2, the VCM 16 is discussed in further detail. The VCM 16 includes a video bus (VBus) 28 with which various I/O, data transfer and storage components communicate. Preferably, the VBus is a high speed, 32 bit data burst transfer bus which is expandable to 64 bit. The 32 bit implementation has a sustainable maximum bandwidth of approximately 60 MBytes/sec. In one example, the bandwidth of the VBus is as high as 100 MBytes/sec.

The storage components of the VCM reside in the EPC memory section 30 and the mass memory section 32. The EPC memory section includes the EPC memory 24, the EPC memory being coupled with the VBus by way of a DRAM controller 33. The EPC memory, which is preferably DRAM, provides expansion of up to 64 MBytes, by way of two high density 32 bit SIMM modules. The mass memory section 32 includes a SCSI hard drive device 34 coupled to the VBus by way of a transfer module 36a. As will appear, other I/O and processing components are coupled respectively to the VBus by way of transfer modules 36. It will be appreciated that other devices (e.g. a workstation) could be coupled to the VBus by way the transfer module 36a through use of a suitable interface and a SCSI line.

Figure 3:
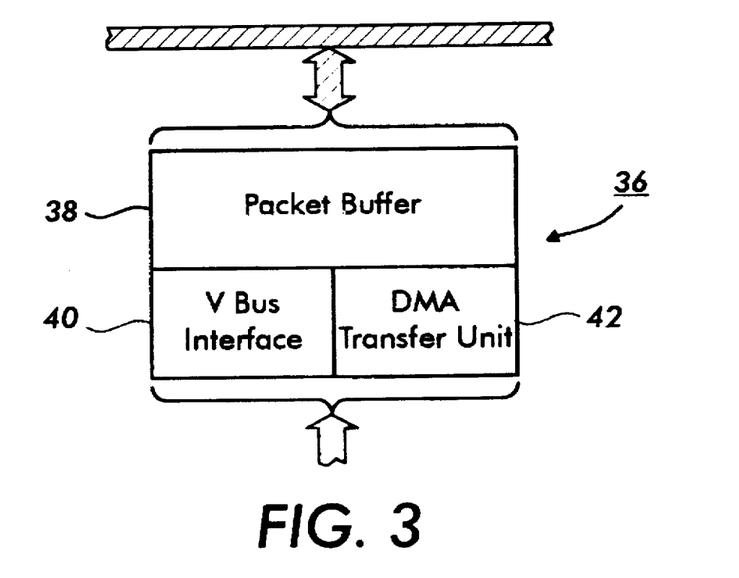
FIG. 3 is a block diagram of a transfer module used in conjunction with the printing machine of FIG. 2.

Referring to FIG. 3, the structure of one of the transfer modules 36 is discussed in further detail. The illustrated transfer module of FIG. 3 includes a packet buffer 38, a VBus interface 40 and DMA transfer unit 42. The transfer module 36, which was designed with "VHSIC" Hardware Description Language (VHDL), is a programmable arrangement permitting packets of image data to be transmitted along the VBus at a relatively high transfer rate. In particular, the packet buffer is programmable so that the segment or packet can be varied according to the available bandwidth of the VBus. In one example, the packet buffer can programmed to handle packets of up to 64 Bytes. Preferably, the packet size would be reduced for times when the VBus is relatively busy and increased four times when activity on the bus is relatively low.

Figure 5:
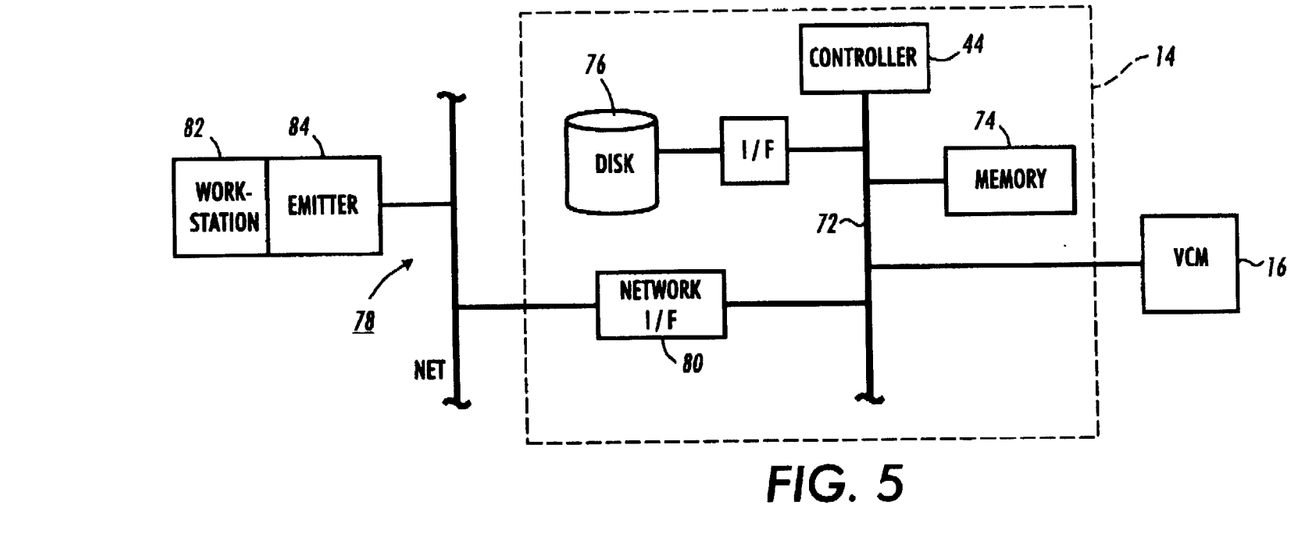
FIG. 5 is a block diagram of a network controller for the printing machine of FIG. 1.

Adjustment of the packet size is achieved with the VBus interface 40 and a system controller 44 (FIG. 5). Essentially, the VBus interface is an arrangement of logical components, including, among others, address counters, decoders and state machines, which provides the transfer module with a selected degree of intelligence. The interface 40 communicates with the system controller to keep track of desired packet size and, in turn, this knowledge is used to adjust the packet size of the packet buffer 38, in accordance with bus conditions. That is, the controller, in view of its knowledge regarding conditions on the VBus 28, passes directives to the interface 40 so that the interface can adjust packet size accordingly. Further discussion regarding operation of the transfer module 36 is provided below.

More particularly, each imageThe DMA transfer unit employs a conventional DMA transfer strategy to transfer the packets. In other words, the beginning and end addresses of the packet are used by the transfer unit in implementing a given transfer. When a transfer is complete, the interface 40 transmits a signal back to the system controller 44 so that further information, such as desired packet size and address designations, can be obtained.

Figure 4:
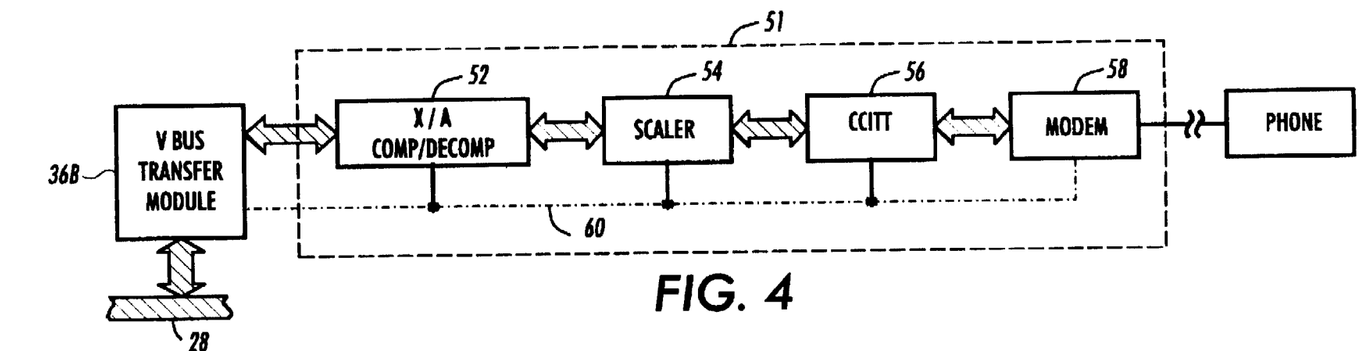
FIG. 4 is a block diagram of a facsimile card used in conjunction with the printing machine of FIG. 2.

Referring to FIGS. 1 and 2, three I/O components are shown as being coupled operatively to the VBus 28, namely a FAX module 48, the scanner or IIT 18, and the printer or IOT 20; however, it should be recognized that a wide variety of components could be coupled to the VBus by way an expansion slot 50. Referring to FIG. 4, an implementation for the FAX module, which is coupled to the VBus 28 by way of transfer module 36b, is discussed in further detail. In the preferred embodiment, a facsimile device (FAX) 51 includes a chain of components, namely a section 52 for performing Xerox adaptive compression/decompression, a section 54 for scaling compressed image data, a section 56 for converting compressed image data to or from CCITT format, and a modem 58, preferably manufactured by Rockwell Corporation, for transmitting CCITT formatted data from or to a telephone, by way of a conventional communication line.

Referring still to FIG. 4, each of the sections 52, 54 and 56 as well as modem 58 are coupled with the transfer module 36b by way of a control line 60. This permits transfers to be made to and from the FAX module 48 without involving a processor. As should be understood, the transfer module 36b can serve as a master or slave for the FAX module in that the transfer module can provide image data to the FAX for purposes of transmission or receive an incoming FAX. In operation, the transfer module 36b reacts to the FAX module in the same manner that it would react to any other I/O component. For example, to transmit a FAX job, the transfer module 36b feeds packets to the section 52 through use of the DMA transfer unit 42 and, once a packet is fed, the transfer module transmits an interrupt signal to the system processor 44 requesting another packet. In one embodiment, two packets are maintained in the packet buffer 38 so that "ping-ponging" can occur between the two packets. In this way, the transfer module 36b does not run out of image data even when the controller cannot get back to it immediately upon receiving an interrupt signal.

Referring again to FIG. 2, the IIT 18 and IOT 20 are operatively coupled to the VBus 28 by of transfer modules 36c and 36d. Additionally, the IIT 18 and the IOT 20 are operatively coupled with a compressor 62 and a decompressor 64, respectively. The compressor and decompressor are preferably provided by way of a single module that employs Xerox adaptive compression devices. Xerox adaptive compression devices have been used for compression/decompression operations by Xerox Corporation in its DocuTech® printing system. In practice, at least some of the functionality of the transfer modules is provided by way of a 3 channel DVMA device, which device provides local arbitration for the compression/decompression module.

As further illustrated by FIG. 2, the scanner 18, which includes the image processing section 22, is coupled with an annotate/merge module 66. Preferably, the image processing section includes one or more dedicated processors programmed to perform various desired functions, such as image enhancement, thresholding/screening, rotation, resolution conversion and TRC adjustment. The selective activation of each of these functions can be coordinated by a group of image processing control registers, the registers being programmed by the system controller 44. Preferably, the functions are arranged along a "pipeline" in which image data is inputted to one end of the pipe, and image processed image data is outputted at the other end of the pipe. To facilitate throughput, transfer module 36e is positioned at one end of the image processing section 22 and transfer module 36c is positioned at another end of the section 22. As will appear, positioning of transfer modules 36c and 36e in this manner greatly facilitates the concurrency of a loopback process.

Referring still to FIG. 2, arbitration of the various bus masters of the VCM 16 is implemented by way of a VBus arbiter 70 disposed in a VBus arbiter/bus gateway 71. The arbiter determines which bus master (e.g. FAX module, Scanner, Printer, SCSI Hard Drive, EPC Memory or Network Service Component) can access the VBus at one given time. The arbiter is made up of two main sections and a third control section. The first section, i.e., the "Hi-Pass" section, receives input bus requests and current priority selection, and outputs a grant corresponding to the highest priority request pending. The current priority selection input is the output from the second section of the arbiter and is referred to as "Priority Select". This section implements priority rotation and selection algorithm. At any given moment, the output of the logic for priority select determines the order in which pending requests will be serviced. The input to Priority Select is a register which holds an initial placement of devices on a priority chain. On servicing requests, this logic moves the devices up and down the priority chain thereby selecting the position of a device's next request. Control logic synchronizes the tasks of the Hi-Pass and the Priority Select by monitoring signals regarding request/grant activity. It also prevents the possibility of race conditions.

Referring to FIG. 5, the network service module 14 is discussed in further detail. As will be recognized by those skilled in the art, the architecture of the network service module is similar to that of a known "PC clone". More particularly, in the preferred embodiment, the controller 44, which preferably assumes the form of a SPARC processor, manufactured by Sun Microsystems, Inc., is coupled with a standard SBus 72. In the illustrated embodiment of FIG. 5, a host memory 74, which preferably assumes the form of DRAM, and a SCSI disk drive device 76 are coupled operatively to the SBus 72. While not shown in FIG. 5, a storage or I/O device could be coupled with the SBus with a suitable interface chip. As further shown in FIG. 5, the SBus is coupled with a network 78 by way of an appropriate network interface 80. In one example, the network interface includes all of the hardware and software necessary to relate the hardware/software components of the controller 44 with the hardware/software components of the network 78. For instance, to interface various protocols between the network service module 14 and the network 78, the network interface could be provided with, among other software, Netware® from Novell Corp.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in U.S. Pat. No. 5,493,634 to Bonk et al., and U.S. Pat. No. 5,226,112 to Mensing et al., the pertinent portions of both references being incorporated herein by reference. Further details regarding a technique for generating a job in a PDL may be obtained by reference to the following text, the pertinent portions of which are incorporated herein by reference:

PostScript® Language Reference Manual
Second Edition
Addison-Wesley Publishing Co.

Referring again to FIG. 2, the network service module 14 is coupled with the VCM 16 via a bus gateway 88 of the VBus arbiter/bus gateway 71. In one example, the bus gateway comprises a field programmable gate array provided by XILINX corporation. The bus gateway device provides the interface between the host SBus and the VCM VBus. It provides VBus address translation for accesses to address spaces in the VBus real address range, and passes a virtual address to the host SBus for virtual addresses in the host address range. A DMA channel for memory to memory transfers is also implemented in the bus gateway. Among other things, the bus gateway provides seamless access between the VBus and SBus, and decodes virtual addresses from bus masters, such as one of the transfer modules 36, so that an identifier can be obtained from a corresponding slave component. It will be appreciated by those skilled in the art that many components of the printing system 10 are implemented in the form of a single ASIC.

Referring to FIGS. 2, 3 and 5, further discussion regarding DMA transfer of each of the transfer modules 36 is provided. In particular, in one example, the images of a job are stored in the host memory 74 as a series of blocks. Preferably, each block comprises a plurality of packets. In operation, one of the transfer modules 36 is provided, by the controller 44, with the beginning address of a block and the size of the block. In turn, for that block, the transfer module 36 effects a packet transfer and increments/decrements a counter. This procedure is repeated for each packet of the block until the interface 40 determines, by reference to the counter, that the last packet of the block has been transferred. Typically, for each stored image, several blocks are transferred, in a packet-by-packet manner, as described immediately above.

Figure 6:
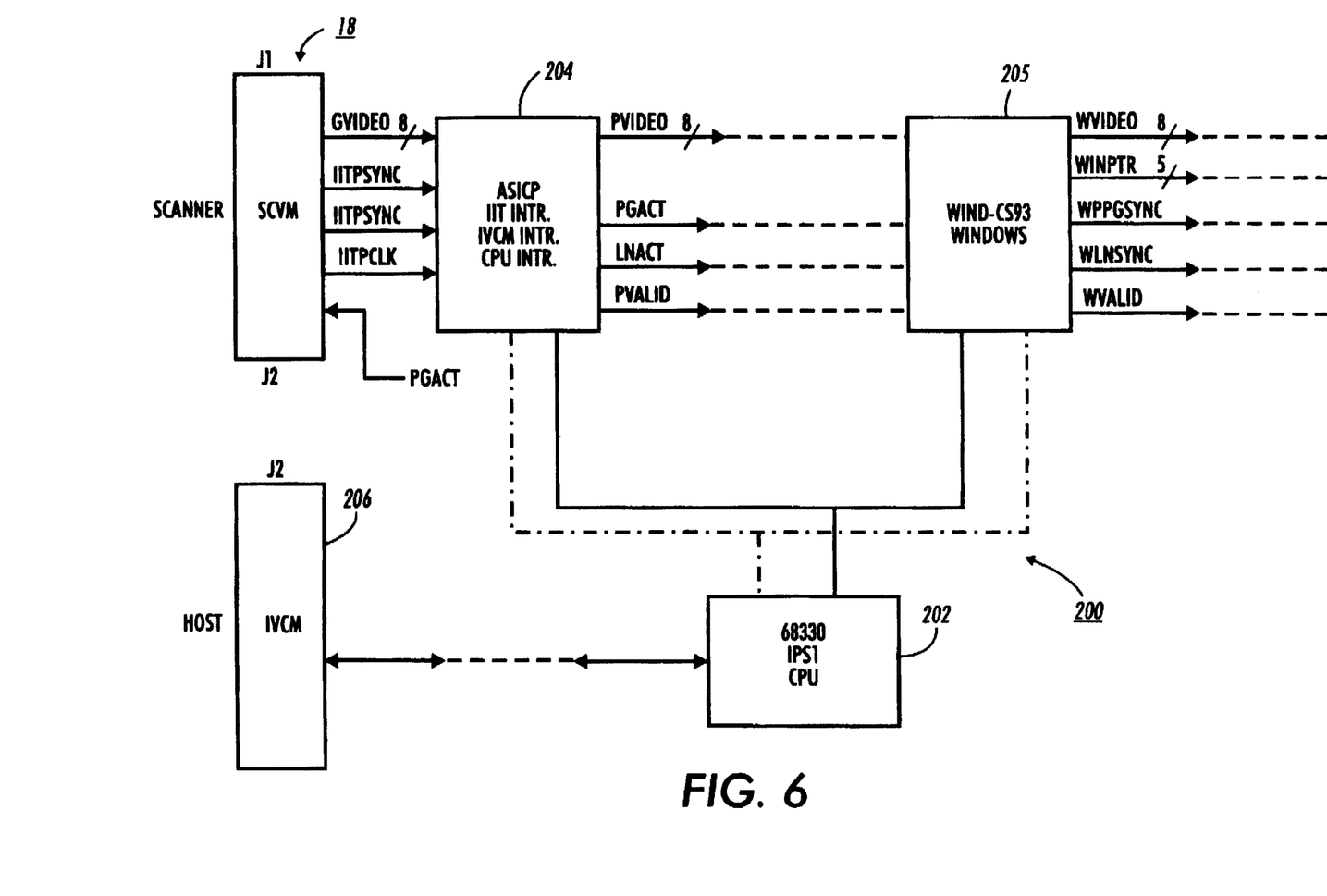
FIG. 6 is a block diagram of a circuit which is suitable implementing the image shifting technique of the preferred embodiment.

Referring now to FIG. 6, a system for shifting an image in an electronic page is designated with the numeral 200. Typically, the system 200 operates in conjunction with the image processing system 22 (Figure) which includes a section referred to as "IPS1", with data being processed in the IPS1 through use of IPS1 CPU 202. The CPU 202, which may comprise the controller 44 (FIG. 5), communicates with an image shift ASIC 204 (referred to as "AsicP") and image processing device 205 (referred to as "Wind-CS93"), as well as the VCM 16 (by way of video control module interface 206 referred to as "IVCM"). Preferably, the AsicP 204 includes a plurality of registers for shifting an output image while the image processing device 205 includes suitable hardware for masking selected video signal portions communicated thereto from the scanner 18. The functionality of the AsicP and the image processing device 205 will appear from the discussion below.

Figure 7A:
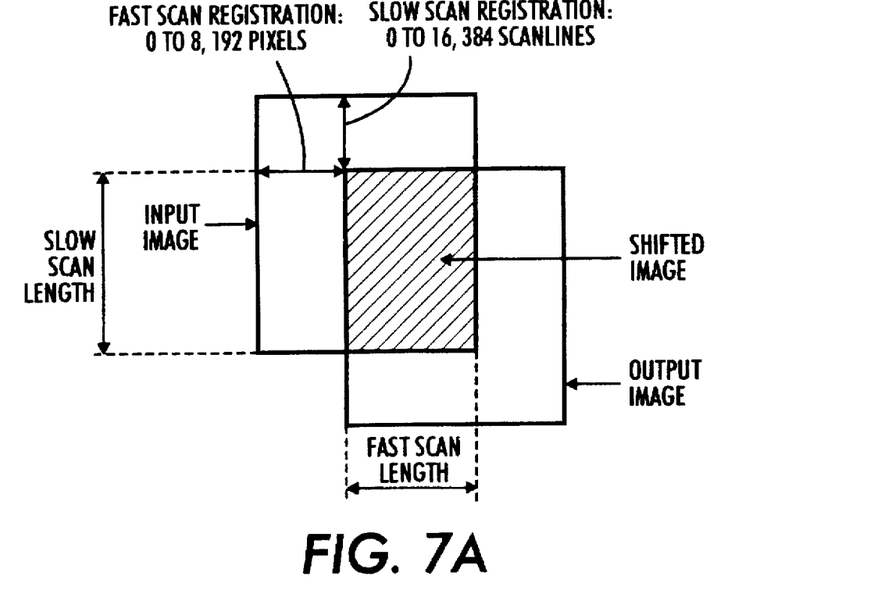
FIGS. 7A and 7B are schematic views of images shifted in accordance with the shifting technique of the preferred embodiment.
Figure 7B:
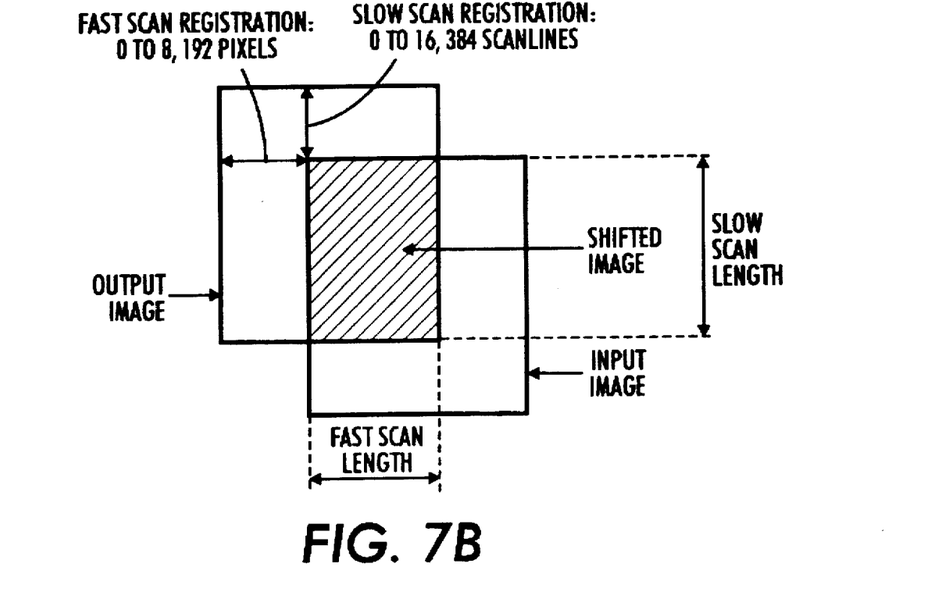

As shown in FIGS. 7A and 7B, shift directions can be achieved in four independent directions, namely up, down, left and right. As shown, in part, by FIGS. 7A and 7B, an output image can be shifted in a combination of direction including, among other directions, up/left and down/right. For the preferred embodiment, contemplated operating descriptions for the image data shifting system 200 are as follows:

| Programmable Registers: | Fast Scan Registration Register (AsicP) |
| --- | --- |
| | Fast Scan Length Register (AsicP) |
| | Slow Scan Registration Register |
| | (AsicP) |
| | Slow Scan Length Register (AsicP) |
| | Fast Scan Shift Mode bit (AsicP) |
| | Slow Scan Shift Mode bit (AsicP) |
| | PgStart bit (AsicP) |
| | Title Size RAM (Wind-CS93) |
| | Effect Pointer RAM (Wind-CS93) |
| Number of scan pixels imaged = | Sum of the Fast Scan Registration Register and the Fast Scan Length Register |
| Number of scan lines imaged = | Sum of the Slow Scan Registration Register and the Slow Scan Length Register |

Figure 8:
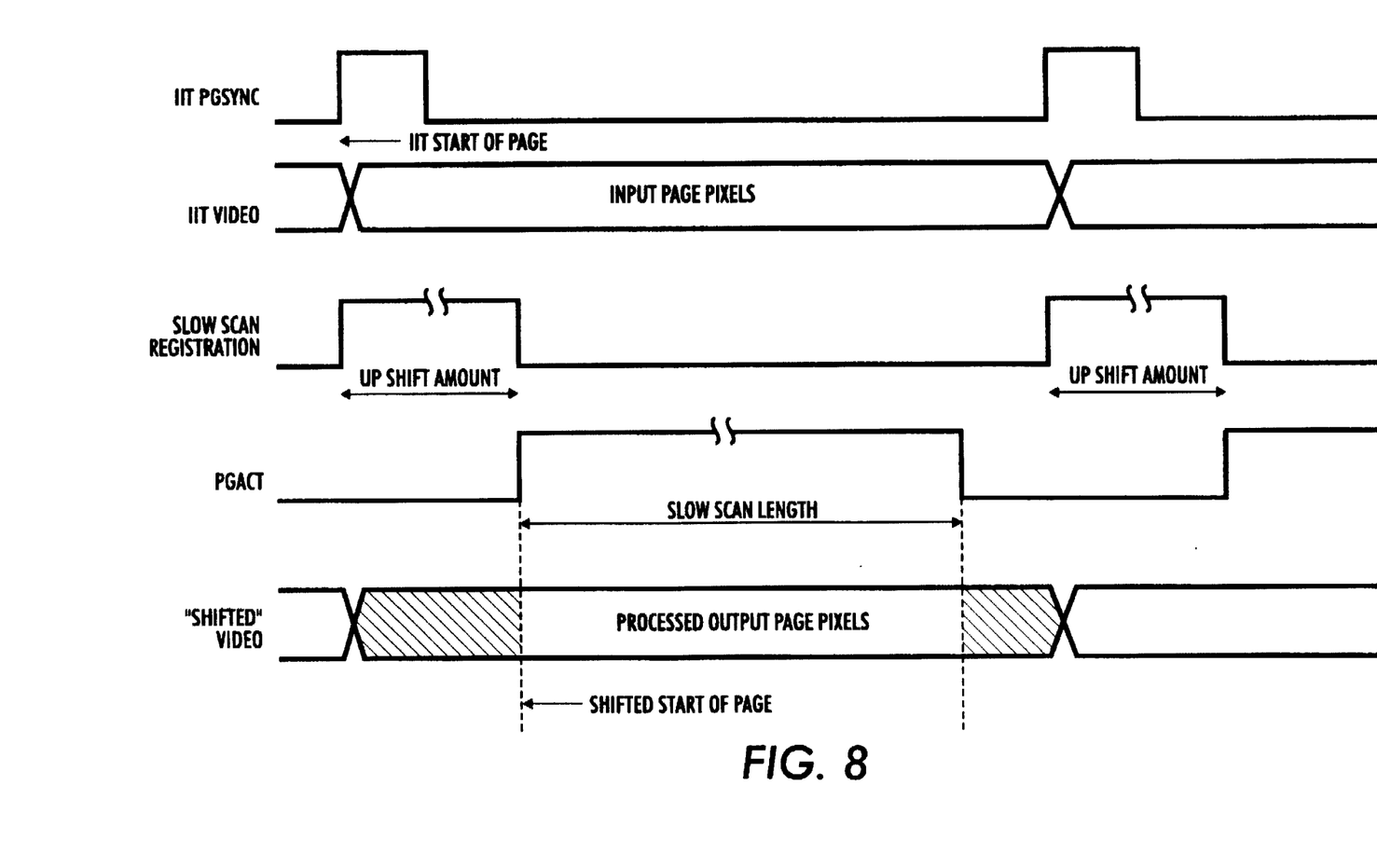
FIG. 8 is a timing diagram demonstrating an approach for shifting an image up relative to its original position in an input document.
Figure 9:
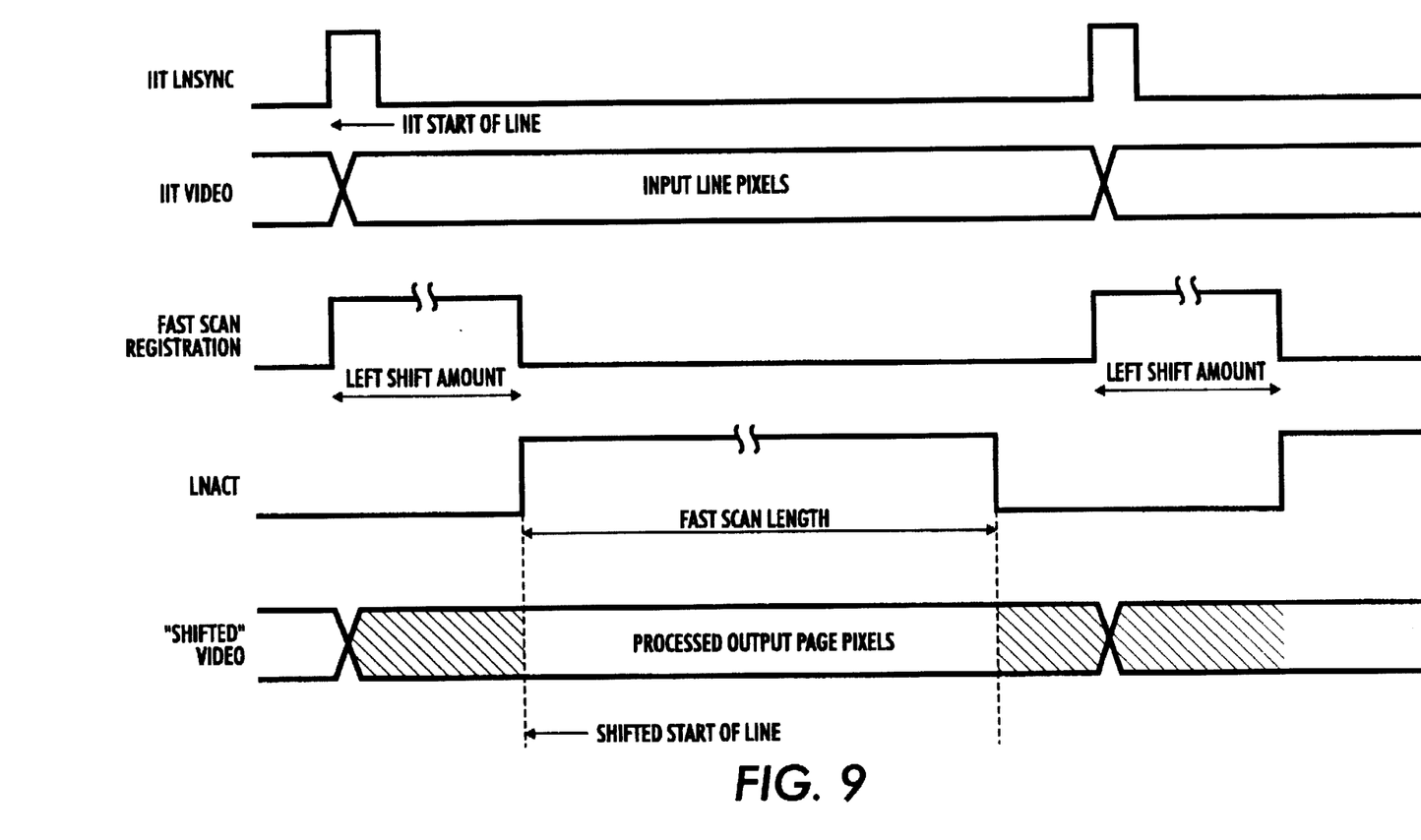
FIG. 9 is a timing diagram demonstrating an approach for shifting the image left relative to its original position in the input document.

Independent shift operations will be discussed by reference to FIGS. 8–11 and the verbal flow diagrams which follow below. It should be appreciated that the setting of registers is achieved with a suitable user interface 208 (FIG. 2). Referring initially to FIGS. 8, 9 and the first two verbal flow diagrams, the relatively simpler shifts for the up and left directions are provided:

Referring to FIGS. 6, 7A and 8, the shift up operation is achieved as follows:

1) The machine controller notifies IPS1 CPU of the upward shift and the shift size.
2) IPS1 CPU programs the slow Scan Registration Register with the amount of upward shift in number of scan lines, the Slow Scan Length Register with the number of scan lines equal to the image slow scan size minus the amount of upward shift.
3) The assertion of IPS1 Page Active signal (PgAct) is delayed from the assertion of the ITPgSync by the number of scan lines in the Slow Scan Registration Register.
4) PgAct is asserted for the number of scan lines in the Slow Scan Length Register, after which PgAct is deasserted.
5) Steps 3 and 4 are repeated for each ITPgSyn pulse.

Referring to FIGS. 6, 7A and 9, the shift left operation is achieved as follows:

1) The machine controller notifies IPS1 CPU of the left shift and the shift size.
2) PS1 CPU programs the Fast Scan Registration Register with the amount of left shift in number of pixels, the Fast Scan Length Register with the number of pixels equal to the image fast scan size minus the amount of left shift.
3) IPS1 CPU clears the Fast Scan Shift bit in the Mode Control Register.
4) The assertion of IPS1 Line Active signal (LnAct) is delayed from the assertion of the ITLnSync by the number of pixels in the Fast Scan Registration Register.
5) LnAct is asserted for the number of pixels in the Fast Scan Length Register, after which LnAct is deasserted. PValid is also asserted at the same time and for the same duration as LnAct (except to indicate invalid pixels during IIT video synchronization).
6) Steps 4 and 5 are repeated for each ITTLnSyn pulse.

Figure 10:
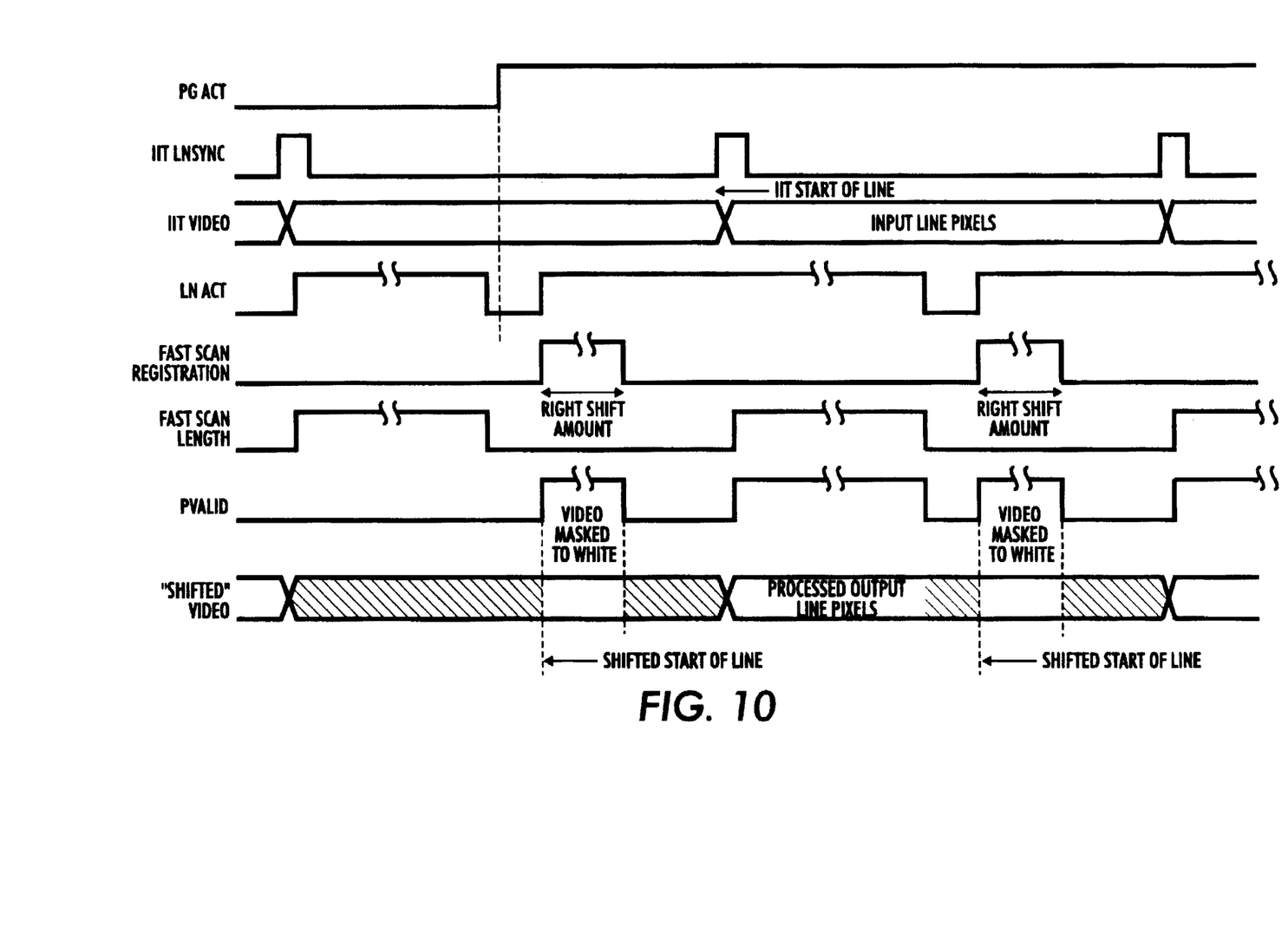
FIG. 10 is a timing diagram demonstrating an approach for shifting the image right relative to its original position in the input document.

Referring to FIGS. 6, 7B and 10, the shift right operation is achieved as follows:

1) The machine controller notifies IPS1 CPU of the right shift and the shift size.
2) IPS1 CPU programs Fast Scan Registration Register with the amount of right shift in number of pixels, the Fast Scan Length Register with the number of pixels equal to the image fast scan size minus the amount of right shift, and the Interline Length Register.
3) IPS 1 CPU program the Window ASIC to white-mask the video in the shift area.
4) IPS1 CPU set the Fast Scan Shift bit in the Mode Control Register.

5) Responding to the next IIT Line Sync pulse (IITLnSync), ASICP will assert the IPS1 Line Active signal (LnAct) for the number of pixels in the Fast Scan Length Register. LnAct will then be deasserted for the number of pixels in the Interline Length Register, after which LnAct is reasserted.

6) At the same time LnAct is reasserted by ASICP, PValid is also asserted. PValid is asserted for the number of scan lines in the Fast Scan Registration Register, after which ASICP will deassert PValid. LnAct remains asserted.

7) The PValid is reasserted at the next IITLnSync pulse. PValid is also asserted and will remain asserted (except to indicate invalid pixels during IIT video synchronization) for the number of pixels in the Fast Scan Length Register. PValid and LnAct will then be deasserted for the number of pixels in the Interline Length Register, after which LnAct and PValid is reasserted.

8) Repeat steps 6 and 7.

9) Effectively the start of the IPS1 Line Active signal is shifted ahead of the IITLnSync.

10) ASICP asserts IPS1 page active (PgAct) signal during the interline gap following arrival of IITPgSync.

11) Responding to PgAct, LnAct and PValid, the Window ASIC will generate the effect pointer to white-mask the video in the shift area.

12) At the end of the job IPS1 CPU clears the Fast Scan Shift mode bit.

Figure 11:
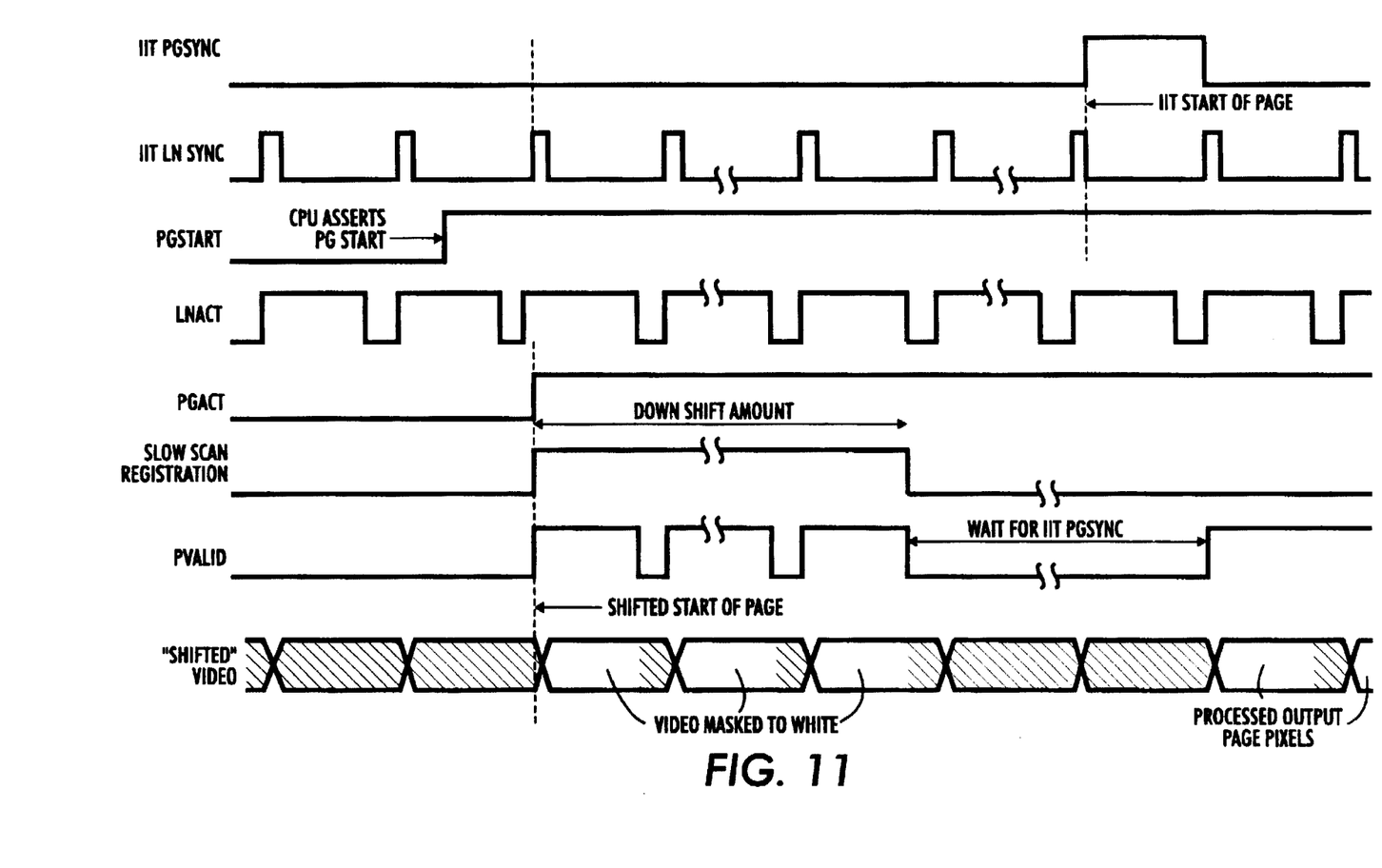
FIG. 11 is a timing diagram demonstrating an approach for shifting the image down relative to its original position in the input document.

Referring to FIGS. 6, 7B and 11, the shift down operation is achieved as follows:

1) The machine controller notifies IPS1 CPU of the downward shift and the shift size.

2) IPS1 CPU programs Slow Scan Registration Register with the amount of downward shift in number of scan lines, the Slow Scan Length Register with the number of scan lines equal to the image slow scan size minus the amount of downward shift, and the Interpage Length Register.

3) IPS1 CPU program the Window ASIC to white-mask the video in the shift area.

4) IPS1 CPU set the Slow Scan Shift bit and the PgStart bit in the Mode Control Register to start the IPS1 Page Active signal (PgAct). The Page Active signal is actually asserted during the interline gap.

5) The scanner controller monitors the PgAct signal from IPS1 before initiating scan. Alternatively IPS1 CPU can be programmed to send a PBus message when IPS1 is ready for scan data.

6) At the same time PgAct is asserted by ASICP, PValid is also asserted. PValid is asserted for the number of scan lines in the Slow Scan Registration Register, after which ASICP will deassert PValid.

7) Responding to PgAct, LnAct and PValid, the Window ASIC will generate the effect pointers to white-mask the video in the shift area.

8) PValid is asserted when IITPgSync arrives with the scan data. PValid will remain asserted for the number of scan lines in the Slow Scan Length Register (except to indicate invalid pixels during IIT video synchronization). ASICP will deassert PgAct at the end of scan page determined by the content of the Slow Scan Length Register.

9) If Slow Scan Shift Mode bit remains set, PgAct is deasserted for the number of scan lines in the Interpage Length Register. After which PgAct is once again asserted and steps 6, 7, 8 and 9 are repeated.

10) The IPS1 CPU has to reset the PgStart bit within the first scan page (first PgAct high duration).

11) At the end of the job IPS1 CPU clears the Slow Scan Shift mode bit.

Figure 12:
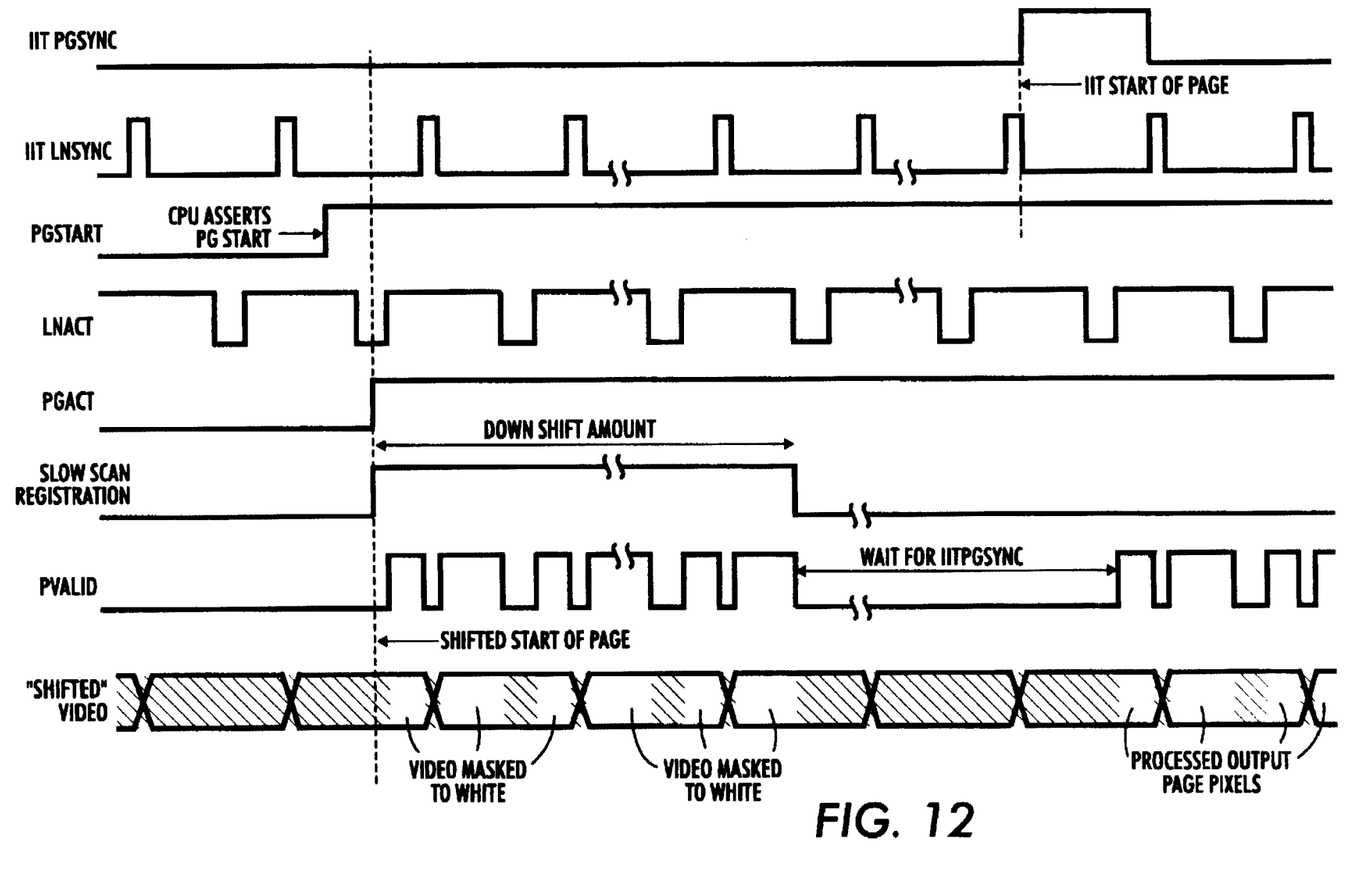
FIG. 12 is a timing diagram demonstrating an approach for shifting the image down and right relative to its original position in the input document.

Referring to FIG. 12, an example of an approach in which the down and right shift operations are exercised simultaneously is shown.

Numerous features of the above-described embodiment will be appreciated by those skilled in the art:

First, an image, disposed in an input data stream can be shifted "on the fly" as it is stored in memory so that the image need not actually be manipulated after storage. Since the image is manipulated as it is being loaded into the memory, there is no need to either add or delete pixels from a stored electronic page. As will be appreciated, this minimizes processing overhead while optimizing memory usage.

Moreover, since the printer is not responsible for shifting the image, a copy of the electronic page including the shifted image can be loaded into memory and then immediately transmitted to a remote site without further manipulation. Indeed, the preferred technique eliminates the need to manipulate the image at the printer for the purpose of image shifting.

Second, the above-disclosed image shifting technique can be achieved with a minimum mount synchronization since the timing for loading fill pixels, i.e. masked pixels, and image data is not critical. In particular, the technique accommodates for a selected time interval to exist between the loading of the fill pixels and the loading of corresponding image data.

Third, by loading fill pixels into memory prior to shifting of the image, it is believed that optimal levels of compression can be obtained. That is an electronic page with fill pixels and image data can be compressed to a greater extent than an electronic page including extraneous image data that is not necessarily as compressible as fill data.

Finally, the disclosed image shifting technique is highly versatile in that it is applicable to a wide variety of input contexts in which an input data stream is utilized. As disclosed, the data stream can have its origin in a variety input sources, such as from a local scanner or a remote driver, without affecting the effectiveness of the technique.

We claim:

1. In a document processing system including a scanning device for reading a document including one or more hardcopy pages and converting the hardcopy pages to corresponding electronic pages with each electronic page being represented by image data, each hardcopy page being scanned as a series of scanlines and the scanner generating a signal prior to scanning each scanline, each scanline read by the scanner being stored in memory as image data representative of a portion of one of the electronic pages, a system for shifting image data for one of the one or more electronic pages, comprising:

an image shifting subsystem for detecting a first signal generated by the scanner and a second signal generated by the scanner; and a write control system for causing a plurality of fill pixels to be written consecutively into the memory, in response to detecting the first signal with said image shifting subsystem, so that upon subsequently writing image data corresponding with a portion of one of the electronic pages into the memory, in response to detecting the second signal with said image shifting subsystem, the presence of the consecutively written fill pixels causes the image data corresponding with the portion of the one of the electronic pages to be shifted relative to a position that the image data originally possessed in the one of the electronic pages.

2. The image data shifting system of claim 1, wherein a shift pulse is generated prior to the detection of the second signal and the plurality of fill pixels are consecutively written into the memory as a function of the shift pulse.

3. The image data shifting system of claim 2, wherein writing of image data to the memory is inhibited during an interval defined by an end of the shift pulse and a beginning of the second signal.

4. The image data shifting system of claim 1, wherein said write control system includes an image processing subsystem so that selected pixels transmitted from the scanner thereto are masked to form the plurality of fill pixels therewith.

5. The image data shifting system of claim 1, further comprising a pixel quantity setting subsystem, responsive to user input, for presetting a number of the plurality of fill pixels.

6. The image data shifting system of claim 5, wherein said pixel quantity setting subsystem comprises a programmable logical device which is programmed to reflect an extent to which the image portion is to be shifted.

7. In a document processing system including a scanning device for reading a document including one or more hardcopy pages and converting the hardcopy pages to corresponding electronic pages with each electronic page being represented by image data, each hardcopy page being scanned as a series of scanlines and the scanner generating a signal prior to scanning each scanline, each scanline read by the scanner being stored in memory as image data representative of a portion of one of the electronic pages, a method for shifting image dam for one of the one or more electronic pages, comprising:

a) detecting, with an image shifting subsystem, a first signal generated by the scanner;

b) detecting, with the image shifting subsystem, a second signal generated by the scanner; and c) prior to detecting the second signal generated by the scanner, writing a plurality of fill pixels consecutively into the memory so that upon subsequently writing image data corresponding with a portion of one of the electronic pages into the memory, in response to detecting the second signal with said b), the presence of the consecutively written fill pixels causes the image data to be shifted relative to a position that the image data originally possessed in the one of the electronic pages.

8. The method of claim 7, further comprising generating a shift pulse prior to said b), the plurality of fill pixels being consecutively written into the page buffer as a function of said generating.

9. The method of claim 8, further comprising inhibiting writing of image data to the memory during an interval defined by an end of the shift pulse and a beginning of the next signal.

10. The method of claim 7, wherein said c) includes transmitting a plurality of scanned pixels, generated by the scanning device, to a masking device to form the plurality of fill pixels.

11. The method of claim 7, further comprising setting the number of the plurality of fill pixels by way of user input.

12. The method of claim 11, wherein said setting comprises programming a logical device to reflect an extent to which the image portion is to be shifted.

13. The method of claim 7, further comprising repeating said a)–c) until at least part of the image data on the one of the electronic pages is shifted by a selected amount and automatically performing said a)–c) repeatedly for another one of the electronic pages to shift at least a part of the image data associated therewith.

14. The method of claim 7, further comprising compressing the plurality of fill pixels prior to said writing of the plurality of pixels in the memory.

15. In a document processing system including a source of image data for generating a data stream with at least a portion of the data stream including image data or a representation thereof, the image data of the data stream corresponding with an image disposed in an original position on an electronic page and the image data being transmitted from the image data source to a memory for storage therein, an image shifting subsystem for inserting pixels into the data stream so that the image data is stored in the memory in a manner causing a reproduction of the image of the electronic page to be shifted relative to its original position, comprising:

a detection system for detecting a time interval during which a plurality of fill pixels are to be written to a first location in the memory; and a write control system, responsive to said detection system, for causing the plurality of fill pixels to be written consecutively to the first location in the memory at a first time so that upon subsequently writing the portion of the data stream including image data to a second location in the memory at a second time, the presence of the consecutively written fill pixels cause said shifting of at least a portion of the reproduction of the image to occur.

16. The image shifting system of claim 15, wherein the plurality of fill pixels are compressed prior to writing the same into the first location in the memory.

17. The image shifting system of claim 15, in which the first and second portions are stored as a plurality of scanlines, wherein respective portions of multiple ones of the plurality of scanlines comprise the plurality of fill pixels.

18. The image shifting system of claim 17, in which the scanlines are disposed along a slow scan axis, wherein the respective portions comprise entire scanlines so that the at least portion of the reproduction of the image is shifted along the slow scan axis.

19. The image shifting system of claim 15, in which the memory communicates with a network, wherein a combination of the image data and plurality of fill pixels written to the memory is transmitted to a location disposed on the network remotely from the memory.

20. The image shifting system of claim 15, wherein the source of image data comprises a scanner for reading a document and converting information contained therein to image data.

21. The image shifting system of claim 15, in which the memory communicates with a network, wherein the source of image data is disposed on the network remotely of the memory.

* * * * *